Figure 1:
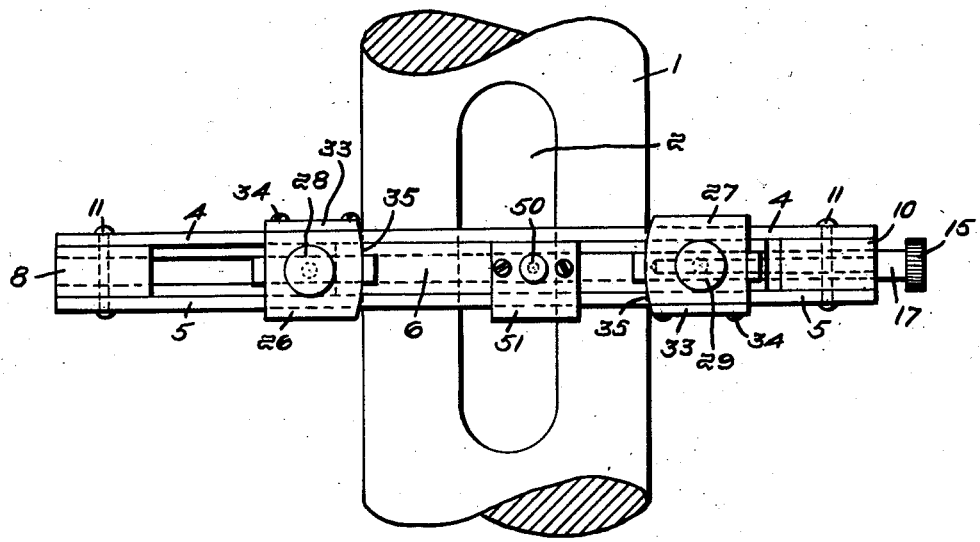

Sept. 24, 1957     F. E. MICHELSON     2,807,091
KEYWAY CHECKERS

Filed July 26, 1954     2 Sheets-Sheet 1

Inventor:
Fred E. Michelson
By James R. Hodder
Attorney

Sept. 24, 1957  F. E. MICHELSON  2,807,091
KEYWAY CHECKERS
Filed July 26, 1954  2 Sheets-Sheet 2
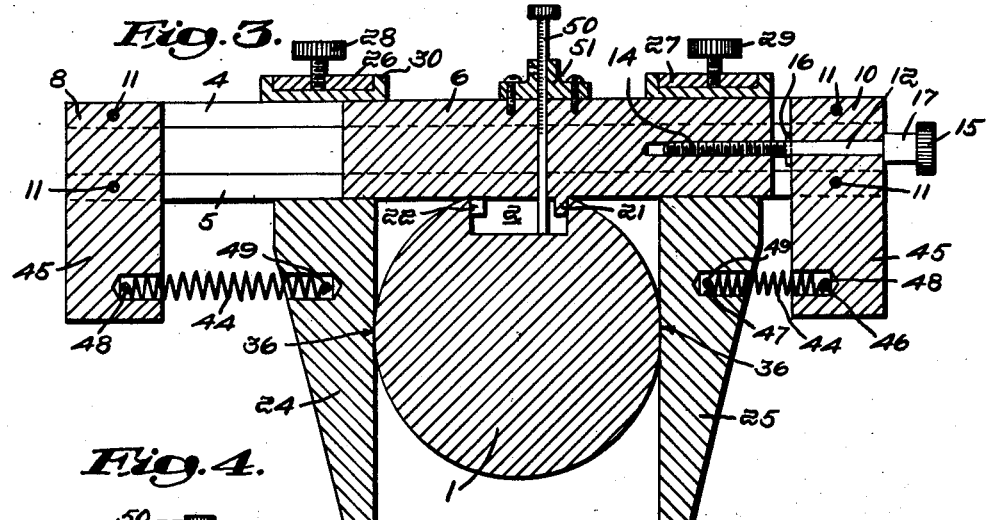
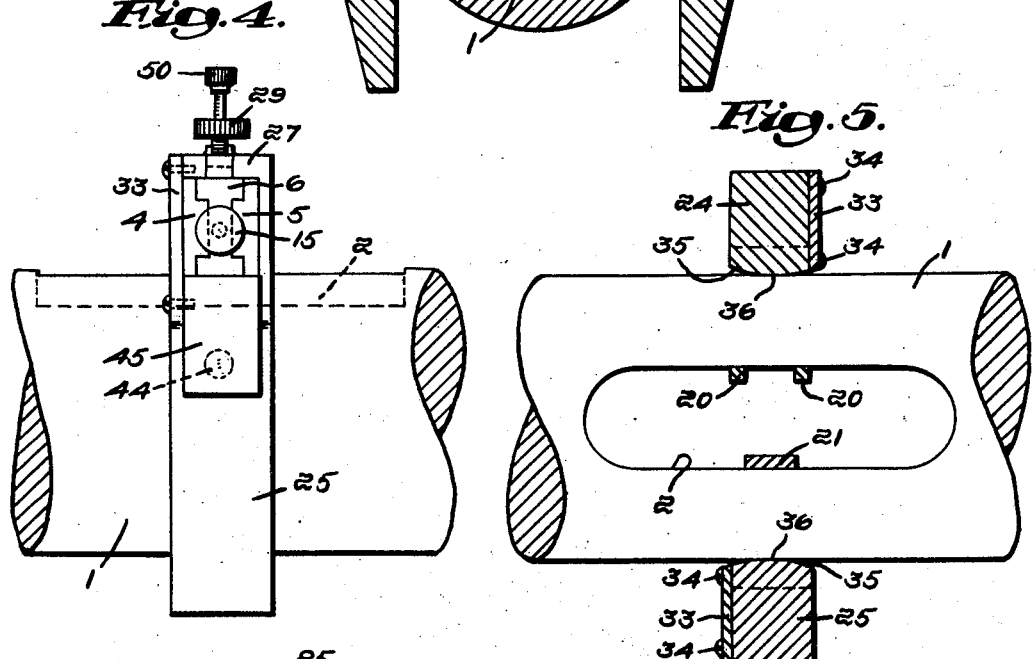
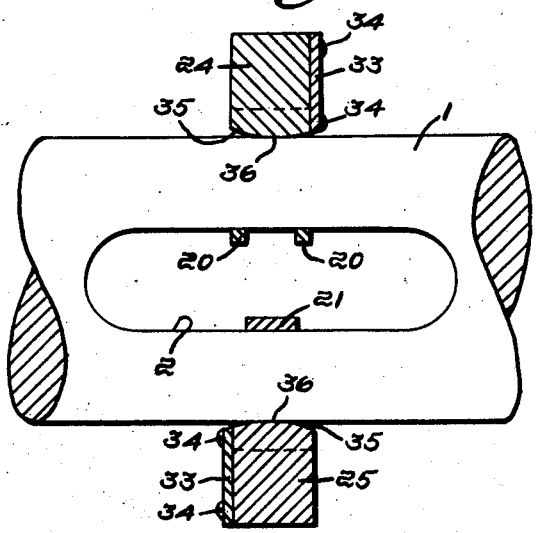
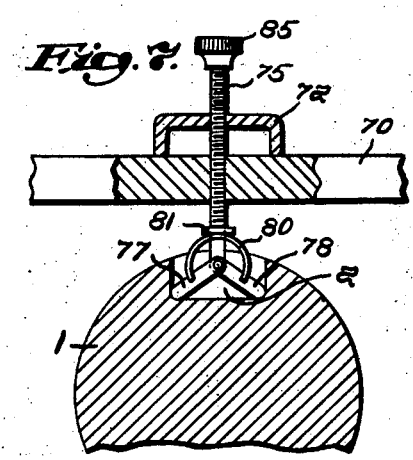
Inventor:
Fred E. Michelson
by James R. Hodder
Attorney

United States Patent Office 2,807,091
Patented Sept. 24, 1957

2,807,091
KEYWAY CHECKERS
Fred E. Michelson, Walpole, Mass.
Application July 26, 1954, Serial No. 445,510
6 Claims. (Cl. 33—174)

My present invention is a novel device for use as a keyway checker, and an object of the invention is to simplify, improve, and perfect measuring instrumentalities capable of accurately checking the position, alignment, width and depth of a keyway as well as to lay out the position of a keyway to be cut.

Heretofore it has required considerable time, great skill, experience, and a plurality of separate devices and operations to accurately determine the setting up of machine operations to cut or mill a keyway, slot, or spline in a shaft and also to thereafter measure and determine the accuracy or inaccuracy of the keyway so cut, measuring the alignment or disalignment of the walls with the axis of the shaft and with each other, and the relative spacing of the same, as well as the depth, all of which involved measurements, skill, and considerable calculation.

Such prior methods relied upon the use of size blocks, separate gauges, micrometer scales or calipers, transferring measurements from one side of the shaft and then on the other, comparing such measurements for inaccuracies, and the like numerous operations, each of which were subject to errors during such use.

My invention is directed to eliminate these prior difficulties and complex methods and to greatly increase accuracy while simplifying and speeding up the keyway checking and laying-out operations.

An important object of the invention is to provide a device which will perform the various checking operations briefly outlined above and which is easily, quickly, and accurately fitted about the shaft in which a keyway is to be cut or in which a keyway has been cut to effect the measurements of the same relative with the axis of the shaft and the accuracy or inaccuracy of each side wall, both with regard to the center line of the shaft and with regard to each other.

Important objects of my improved keyway checker are thus to determine if the keyway is parallel or non-parallel with the axis of the shaft; to determine if the walls of the keyway are equi-distance from said axis; and if either wall is disaligned, and the extent to which it may be inaccurate, and also to measure the width and depth of the keyway.

One of the distinctive novel features of my present invention is the capacity to perform the checking operations on a keyway or cam-like groove which is purposely designed to be eccentric relative to the axis of the shaft, my device being so constructed and arranged as to be fitted along a plurality of positions in such eccentric keyway or cam groove and to register the measurements desired accurately thereon.

My improved device, preferably, includes one or more verniers or scales incorporated therein and capable of immediate and direct readings, although it is possible to utilize a micrometer, caliper, or other outside measuring device if desired.

In carrying out my invention, I provide a pair of relatively sliding members which are constructed and arranged to constitute a crosspiece or body portion adapted to contact with the outside shaft on which a keyway is to be developed or in which a keyway or cut is to be measured, said members being of greater length than the diameter of such shaft.

Each of said sliding members carries an extending arm at right angles to the cross- or body portion and constitute contact means to engage the outside of the shaft in which they are applied at accurately diametrically opposite points. These extending arms are also fitted for longitudinal adjustment on the sliding members to which each is attached and are held in desired longitudinal position by readily accessible set screws. Each of these sliding members also is provided with one or more feeler members parallel with the extending arms in fixed relative position therewith, which feeler members are adapted to engage the walls of a slot cut in the shaft and, thereupon, provided with relative movement to permit the feeler members to contact opposite walls of the keyway and thus to attach the device to the shaft. Also these feelers may be used to determine the relative position in which the keyway is to be developed.

Preferably, I provide at least two of these feeler members in spaced relation on one of the sliding members and a cooperatively positioned feeler on the other member which are so fitted that the single feeler may be nested between the other two when the sliding members are moved together.

Thus, in checking a keyway when cut, these feelers may be positioned in nested relation to enable the same to enter the keyway and, thereupon, spread apart by a suitable threaded connection between the sliding members to contact with and, preferably, interfitted in locking engagement with the keyway; thus holding my novel checker firmly while the desired measurements for location, alignment, width, depth, and the like are made.

In addition to the keyway-engaging feelers, the sliding members are provided with right-angled extending arms which can be slid along each member either by hand or by a spring until contacting at diametrically opposite points on the shaft, or other keyway-carrying element; whereupon a reading of the vernier or the scale quickly determines the position of the keyway relative to the outside diameter of the shaft or element against which the extending arms contact.

While I prefer to employ a pair of such arms, it is feasible to equip the device with one arm if desired, as well as also to attach the device to a bracket or other fixed support. My keyway checker can be used vertically or horizontally, as may be desired.

The operation of first applying the keyway feelers and then moving the side-engaging arms can be reversed, if desired, particularly when utilized to mark the shaft at the point or points where the keyway is to be developed.

It will be appreciated that the combined length of the sliding members will be greater than the diameter of a shaft and the length of the right-angled arms extending therefrom to engage opposite sides of the shaft will be sufficient to measure the largest diameter of the shaft to be operated upon and, thus, provides a capacity for use on a very considerable range of shafts, and in all cases gives a firm three-point contact between the checking device and the shaft or element being checked.

In the accompanying drawings I have illustrated in diagrammatic form a preferred embodiment of my improved keyway checker as applied to a shaft wherein a keyway is formed, which keyway may be checked in every measurement desired, as above outlined.

Figure 2:
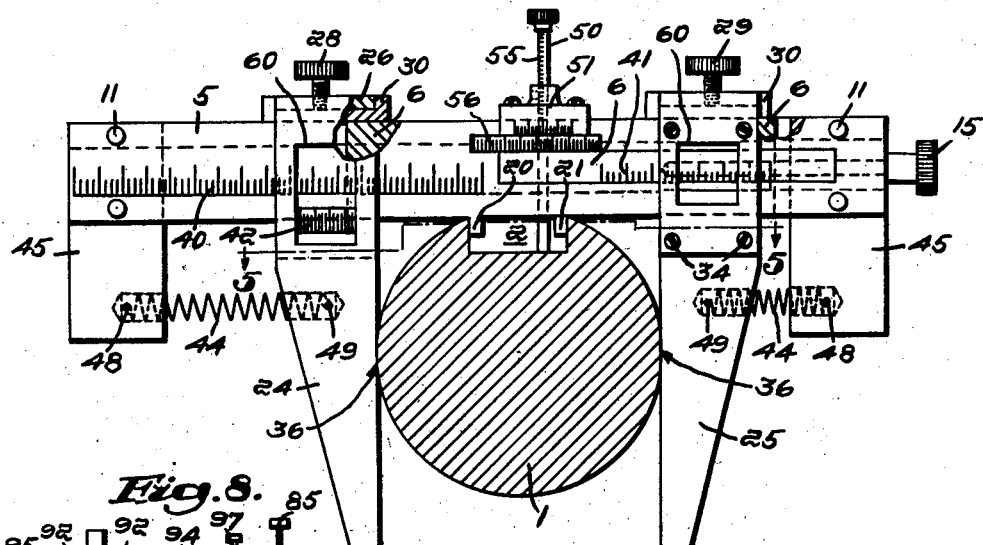
Figure 3:
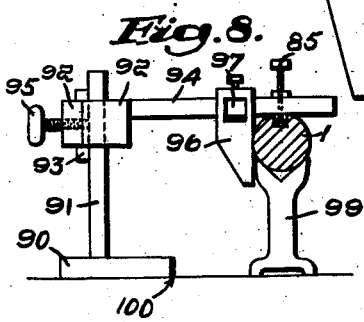

Referring to the drawings:

Fig. 1 is a top plan view of my device as fitted to a shaft;

Fig. 2 is a side view of the same;
Fig. 3 is a longitudinal cross-sectional view;
Fig. 4 is an end view;
Fig. 5 is a cross-section on the line 5—5 of Fig. 2;
Fig. 6 is a view on a smaller scale of various types of keyways which may be developed and checked by my novel device;
Fig. 7 is a modified depth gauge measuring apparatus, and
Fig. 8 is a schematic view showing my checker supported by a side bracket.

Referring to the drawings illustrating a preferred embodiment with certain detailed modifications, 1 designates a shaft having a keyway or slot 2 formed therein. The sliding cross-members comprise an outer member formed with two sides 4 and 5 spaced from each other, and an inner member 6 adapted to slide between sides 4 and 5. These members 4 and 5 are united at their opposite ends by cross-pieces 8 and 10, secured by bolts 11, 11, and the member 6 is arranged to slide by a threaded screw 12 with its shank passing thru a bored opening in the cross-piece 10, and with the threaded end engaging a correspondingly tapped recess 14 in the adjacent end of the member 6. This adjusting screw is rotated by a thumb nut 15 and is held in position in the end piece 10 by a collar 16 and an enlarged hub 17, as shown in Fig. 6. The two outer members 4 and 5 are each provided with a rigidly extending lug or feeler as shown at 20, one depending from the member 4 and one from the member 5; and the middle sliding member 6 has a cooperating depending lug or feeler 21, which may be and preferably is in position to nest between the lugs 20—20, so that when the two sliding members are in completely collapsed position, it will thus permit them to be applied within a narrow keyway.

With the sliding members assembled crosswise on a shaft, with the feeler lugs 20 and 21 fitted within the slot 2, the adjusting screw is then manipulated to expand the telescoping members until these feelers are contacting the opposite walls of the slot and the checker is thus temporarily clamped to the shaft by the gripping contact of these sets of feelers.

If desired, a plurality of such feeler members may be fitted on each sliding member, but I find that two (one on each side) on the outer member and a cooperating lug on the middle member constitutes a preferred construction.

I provide a pair of depending arms 24 and 25, respectively, having collars 26 and 27, respectively, which collars are proportioned to fit and slide longitudinally on the outer portions designated as 4 and 5. These arms extend at right angles with the longitudinal axis of the members 4, 5, and 6 and are formed with the inner face of the depending arms in exact parallelism with the feeler lugs 20 and 21. When the checker is applied to a shaft, the depending arms are spaced sufficiently to be positioned about the shaft and thereupon are moved lengthwise to contact diametrically opposite points on the shaft, as shown in Figs. 2 and 3. Each coller is, preferably, provided with set screws as indicated at 28 and 29, which set screws bear against a wearing member 30 fitted under each collar, as best shown in Fig. 3. In order to facilitate assembling of these collars on the members, I form the collars with one side open, which is covered by a plate, as indicated at 33, in each, secured by a set of bolts 34—34.

Thus the depending arms 24 and 25 may be moved longitudinally on the sliding cross-members until their slightly curved inner faces 35—35, see Fig. 5, contact with the outside of the shaft 1 as indicated at 36—36, which points of contact will be diametrically opposite, and being parallel with the feeler lugs 20 and 21, will enable the checking of the walls of the keyway engaged by the feelers to be measured relatively with the axis of the shaft. Calipers, micrometer scale, or the like may be used for this purpose, but I prefer to form directly on the members scales as indicated at 40 and 41, together with a vernier scale 42, as best shown in Fig. 2, thus providing an instant and self-contained measuring and checking indicator.

While the depending arms 24 and 25 may be manually moved as above explained, I may prefer to have them move automatically as by springs 44. For this purpose, I may extend the end pieces 8 and 10, as shown at 45, Figs. 2 and 3, fitting the opposite ends of each spring in the cooperating recesses 46 and 47 in the depending portions and the adjacent parts of the arms 24 and 25, as clearly shown, holding these springs by pins 48 and 49, or in any other desired manner.

In order to also measure the depth of the slot, I provide a depth gauge 50 arranged to extend thru a cross-piece 51, which cross-piece is secured to the inner member 6 and extends over the top of the sides 4 and 5 of the outer member or over one side, which also thus supports the inner end of the gauge when relative movement is effected by rotating the adjusting screw 15.

This member 50 may have an indicating scale 55 marked thereon which shows the depth of the slot and cooperates with the horizontal scale 56 to measure the position of the depth gauge in the slot relatively with the feeler lugs, as will be readily appreciated.

To facilitate reading of the scales 40 and 41, as well as of the vernier 42, I provide openings or windows 60 in each of the arms 24 and 25, as best shown in Fig. 2.

Referring to Fig. 6, I have illustrated in various relative positions keyways which may device is adapted to check and measure. Thus at the right of the showing of the shaft 1, on a reduced scale, is the keyway 2 substantially centrally positioned and in alignment with the axis of the shaft. An eccentric keyway 62 is also illustrated to which my checking device is readily fitted. The keyway feeling members 20 and 21 are expanded to contact the walls of this keyway, the extent of the disalignment with regard to the axis of the shaft being determined by the position of the arms 24 and 25, which are instantly registered by the scales 40 and 41, as will be readily appreciated.

An eccentric keyway or cam groove 64 can also be measured by my device, the telescoping members being applied at right angles to the line of the keyway and the feller members 20 and 21 expanded into gripping position; and thereupon the arms 24 and 25 contact with the outer walls of the shaft in this angular position by reason of the curved faces 35 thereon.

In Fig. 7 I have illustrated a modified form of locating lugs wherein a rod 75 is threaded thru the cross-bar or brace 70 and a bracket 72, which rod is rotated by a knurled nut 85, to expand or retract the slot-engaging arms or wings.

The lower end of the rod 75 is pivoted to said arms or wings 77 and 78 which are normally actuated to be yieldingly moved toward each other by a spring 80, the central part of the spring being attached to a collar 81 on the shaft, as clearly shown. When the shaft 75 is rotated to move downwardly and the ends of the wings 77 and 78 strike the bottom of the keyway 2, they will be spread or expanded until striking the walls, as clearly shown in Fig. 7.

Referring to the modification illustrated in Fig. 8, I have illustrated my keyway checker mounted for vertical adjustment on a movable side support, which support extends upwardly from a base which can can be slid lengthwise of the shaft to check successive portions of a keyway or a plurality of keyways.

Also, in this particular form I am enabled to untilize either two or one of the depending arms 25. Also, in this particular form, I can readily utilize the keyway clamping device as shown in Fig. 7.

As shown in Fig. 8, a suitable base 90 has a standard 91 extending therefrom on which an encircling block 92 is fitted to slide with a bearing member 93, similar to that lettered 30 as above described, on which a thumb nut 95 is threaded thru a corresponding tapped recess to clamp the block 92 in any adjusted position desired. I have roughly indicated at 94 my keyway checker with a depending arm 96, with a window 97 therein, which arm corresponds with that previously described as 24 or 25. Two such arms can be fitted, if desired, but in this particular case a single arm in combination with a supporting bracket is sufficient.

The shaft 1 is mounted on a support 99 of usual construction and in this form, for simplification, I have illustrated the modified keyway gripper of Fig. 7, as indicated at 85. The base 90 may slide on the work support 100 for relative movement with the shaft 1 for successive measurements.

I claim:

1. A keyway checker of the kind described comprising a pair of cooperating longitudinally slidable inner and outer members adapted to be positioned crosswise of the shaft in which is a keyway to be checked, each sliding member carrying at least one depending feeler to contact opposite walls in the keyway slot, which feelers nest together when the sliding members are in collapsed position, the outer sliding member having adjustably secured thereon a pair of longitudinally movable collars formed with a depending arm extending in parallelism with said feelers, said arms being located on opposite sides of said feelers, and said arms being of a length to contact with the outside of said shaft at diametric points of said shaft, in combination with means to indicate the position of the keyway feelers relatively to the outside diameter of said shaft.

2. Construction as set forth in claim 1 wherein one of the keyway feelers comprises a plurality of contacts for engagement with one wall of the keyway slot.

3. Construction as set forth in claim 1 wherein the longitudinal movement of the sliding members crosswise of the shaft, with the feelers extending within a keyway slot in said shaft automatically locks the checker to the shaft by frictional engagement of the feelers with the opposite walls of the keyway.

4. Construction as set forth in claim 1 wherein the relative position of the keyway feelers when in frictional contact with the opposite walls of the keyway slot, in combination with the arms engaging diametrically opposite points on the shaft in which said keyway is formed, will indicate the alignment or disalignment of the walls of said keyway with the axis of said shaft.

5. Construction as set forth in claim 1, wherein the lower portions of the depending arms are curved to permit the assembling of the sliding members on a shaft in an eccentric position relatively to the diameter of the shaft, when the keyway feelers are in contact with the walls of a keyway slot eccentric to the axis of said shaft.

6. A keyway checker of the kind described, having keyway wall-engaging means carried by relatively slidable members, each member provided with one of said engaging means to temporarily unite the checker to a slotted element having a keyway formed therein with vertical walls, in combination with a depending arm mounted to slide on one of said members and extending at right angles to said checker in parallelism with said keyway-engaging means and adjustable lengthwise thereon adapted to contact with the outside surface of said element and cooperatively slidable to measure the relative position of the keyway walls in said element.

References Cited in the file of this patent

UNITED STATES PATENTS

| | | |
|---|---|---|
| 1,455,083 | Deuter | May 15, 1923 |
| 2,494,152 | Ablett | Jan. 10, 1950 |
| 2,522,886 | Moore | Sept. 19, 1950 |
| 2,569,873 | Stacey | Oct. 2, 1951 |
| 2,650,437 | Glynn | Sept. 11, 1953 |
| 2,677,894 | Belgard | May 11, 1954 |